(12) United States Patent
Moses et al.

(10) Patent No.: US 6,571,144 B1
(45) Date of Patent: May 27, 2003

(54) SYSTEM FOR PROVIDING A DIGITAL WATERMARK IN AN AUDIO SIGNAL

(75) Inventors: Donald W. Moses, Eagan, MN (US); Robert W. Moses, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/421,574

(22) Filed: Oct. 20, 1999

(51) Int. Cl.[7] .......................... G06F 17/00; H04N 7/167
(52) U.S. Cl. .......................... 700/94; 381/56; 380/236; 380/238
(58) Field of Search .................. 700/94; 381/56, 381/61; 380/53, 236, 237, 238, 239, 59, FOR 119; 713/176; 382/100

(56) References Cited

U.S. PATENT DOCUMENTS

| 5,612,943 A | 3/1997 | Moses et al. |
| 5,751,806 A | 5/1998 | Ryan ........................... 380/9 |
| 5,822,432 A | 10/1998 | Moskowitz et al. .......... 380/28 |
| 5,905,800 A | 5/1999 | Moskowitz et al. |
| 5,915,027 A | 6/1999 | Cox et al. ..................... 380/54 |
| 5,940,134 A | 8/1999 | Wirtz ........................... 348/473 |
| 6,061,793 A | 5/2000 | Tewfik et al. ................ 713/176 |

FOREIGN PATENT DOCUMENTS

EP 0891071 1/1999 ............ H04N/1/32

OTHER PUBLICATIONS

1996 IEEE International Conference on Multimedia Computing and Systems, Jun. 17–23, Hiroshima, Japan; Laurence Boney et al.; "Digital Watermarks for Audio Signals", pp 473–480.

Primary Examiner—Xu Mei
(74) Attorney, Agent, or Firm—Blakely, Sokoloff, Taylor & Zafman LLP

(57) ABSTRACT

The foregoing problems are solved and a technical advance is achieved by a computer-implemented system for providing a digital watermark in an audio signal. In a preferred embodiment, a audio file, such as a .WAV file, representing an audio signal to be watermarked is preprocessed using an algorithm of the present invention herein referred to as the "PAWS algorithm" to determine and log the location and number of opportunities that exist for inserting a watermark into the audio signal such that it will be masked by the audio signal. The user can adjust certain parameters of the PAWS algorithm before the audio file is processed. A/B/X testing between the original and watermarked files is also supported to allow the user to undo or re-encode the watermark, if desired.

59 Claims, 6 Drawing Sheets

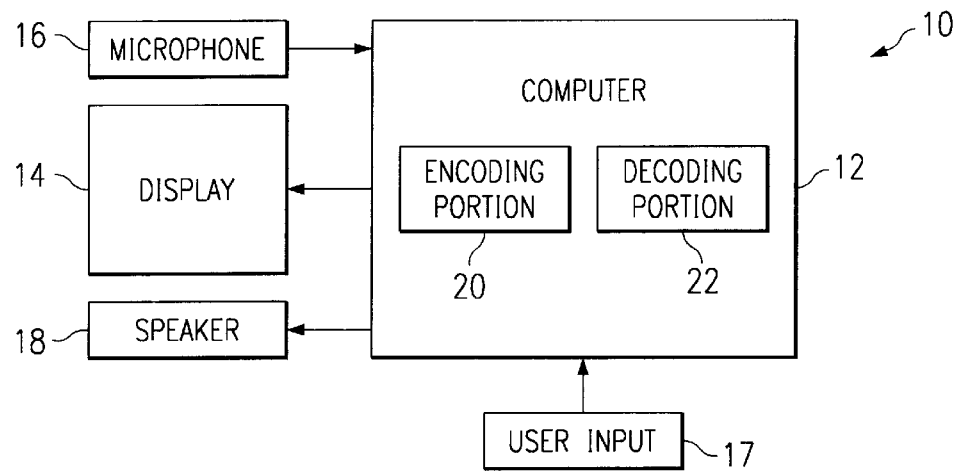
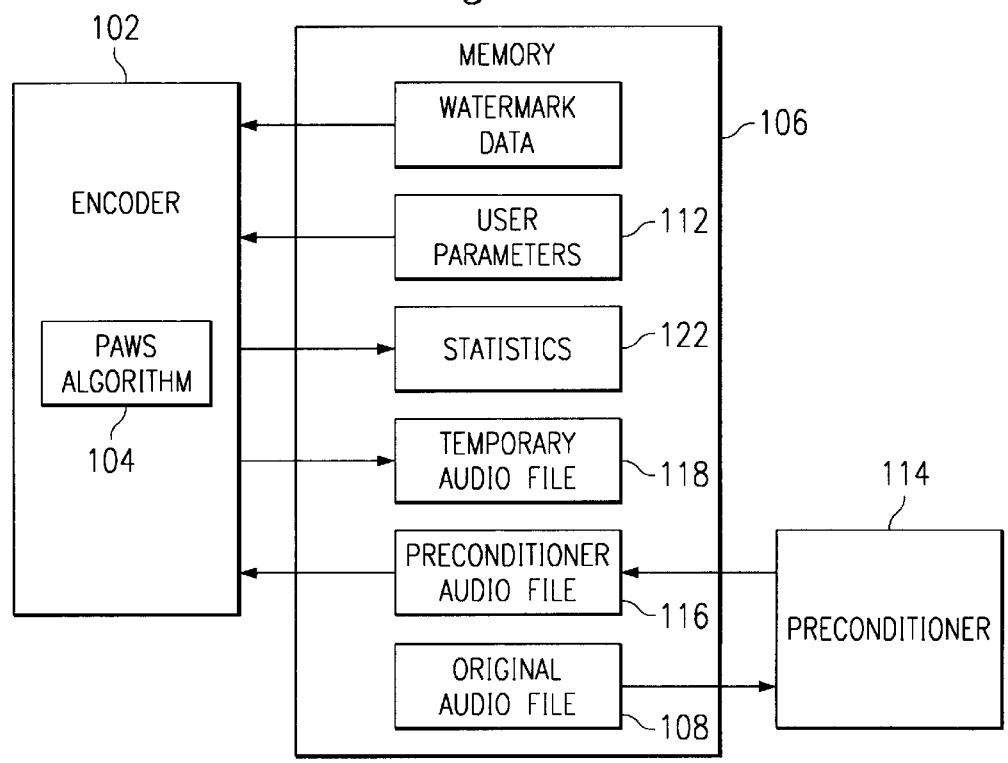

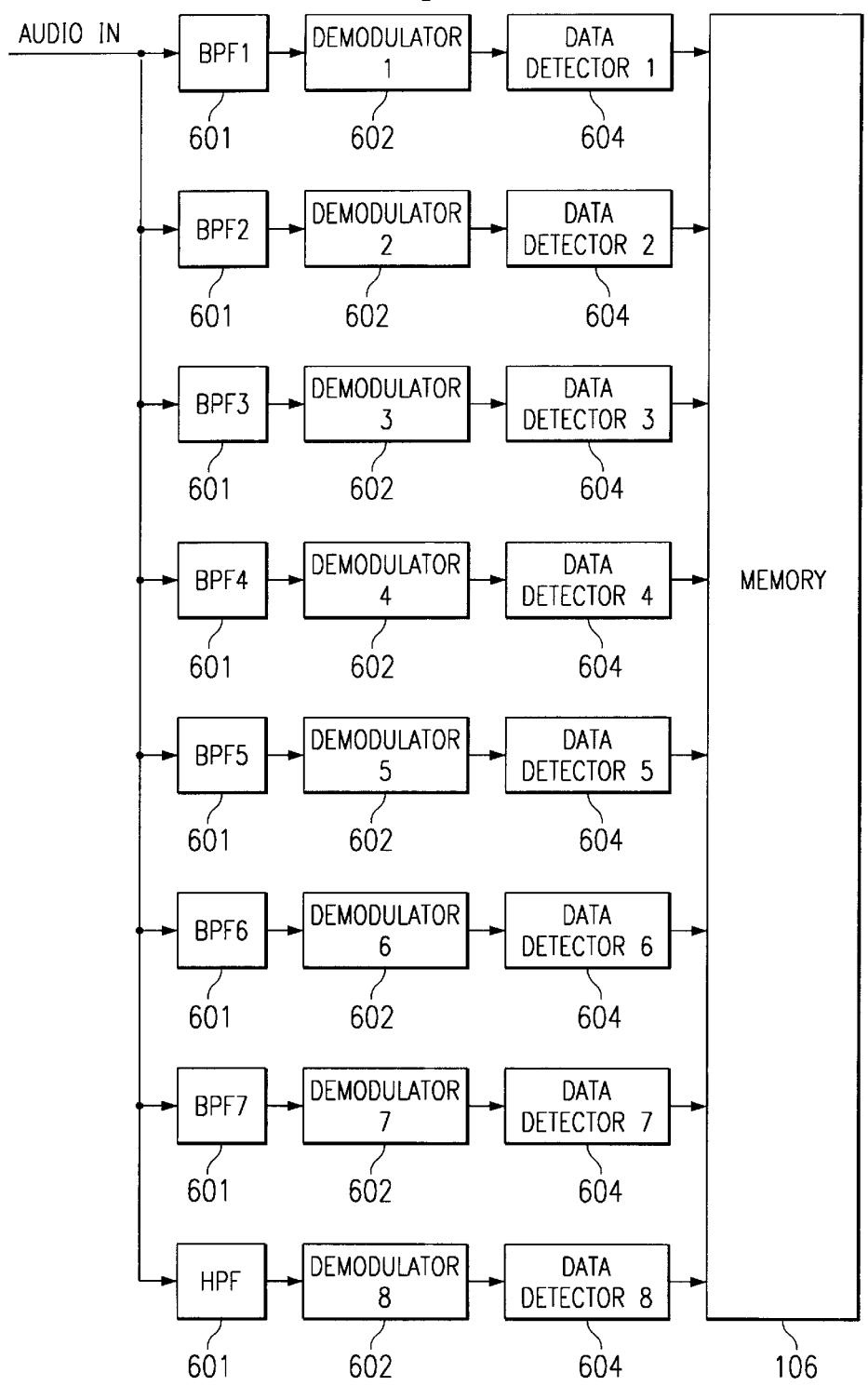

SYSTEM FOR PROVIDING A DIGITAL WATERMARK IN AN AUDIO SIGNAL

This application is related to U.S. Pat. No. 5,404,377 to Donald W. Moses and U.S. Pat. No. 5,612,943 to Robert W. Moses et al., both of which are hereby incorporated by reference in their entireties.

BACKGROUND OF THE INVENTION

This invention relates generally to signal processing systems, and more particularly to a signal processing system for providing a digital watermark in an audio signal.

With the advent of computer networks and digital multimedia, protection of intellectual property has become a prime concern for creators and publishers of digitized copies of copyrightable works, such as musical recordings, movies, and video games. Once method of protecting copyrights in the digital domain is to use digital "watermarks." Digital watermarks can be used to mark each individual copy of a digitized work with information identifying, inter alia, the title, copyright holder, and even the licensed owner of a particular copy. Watermarks can also serve to allow for secured metering and support of other distribution systems of a given media content. In theory, almost any item of information could be encoded and used as a watermark.

Digital watermarks are created by encoding a data signal, hereinafter referred to as the "watermark signal," "watermark data," or simply "watermark", which is then integrated into a larger content signal, hereinafter referred to as the "audio signal", to create a composite signal. Ideally, the composite signal should contain minimal or no perceptible artifacts of the watermark.

It is known in the art that every audio signal generates a perceptual concealment function which masks audio distortions existing simultaneously with the signal. Accordingly, any distortion, or noise, introduced into the transmission channel if properly distributed or shaped, will be masked by the audio signal itself. Such masking may be partial or complete, leading either to increased quality compared to a system without noise shaping, or to near-perfect signal quality that is equivalent to a signal without noise. In either case, such "masking" occurs as a result of the inability of the human perceptual mechanism to distinguish between two signal components, one belonging to the audio signal and the other belonging to the noise, in the same spectral, temporal or spatial locality. An important effect of this limitation is that the perceptibility of the noise by a listener can be zero, even if the signal-to-noise ratio is at a measurable level. Ideally, the noise level at all points in the audio signal space is exactly at the level of just-noticeable distortion, which limit is typically referred to as the "perceptual entropy envelope" or "PEE".

Hence, the main goal of noise shaping is to minimize the perceptibility of distortions by advantageously shaping it in time or frequency so that as many of its components as possible are masked by the audio signal itself. See Nikil Jayant et al., *Signal Compression Based on Models of Human Perception*, 81 Proc. of the IEEE 1385 (1993).

"Perceptual coding" techniques employing the above-discussed principles are presently used in signal compression and are based on three types of masking: frequency domain, time domain and noise level. The basic principle of frequency domain masking is that when certain strong signals are present in the audio band, other lower level signals, close in frequency to the stronger signals, are masked and not perceived by a listener. Time domain masking is based on the fact that certain types of noise and tones are not perceptible immediately before and after a larger signal transient. Noise masking takes advantage of the fact that a relatively high broadband noise level is not perceptible if it occurs simultaneously with various types of stronger signals.

Perceptual coding forms the basis for precision audio sub-band coding (PASC), as well as other coding techniques used in compressing audio signals for mini-disc (MD) and digital compact cassette (DCC) formats. Specifically, such compression algorithms take advantage of the fact that certain signals in an audio channel will be masked by other stronger signals to remove those masked signals in order to be able to compress the remaining signal into a lower bit-rate channel.

One of the deficiencies of conventional systems for adding a watermark to an audio signal is that the watermark is encoded on a single frequency band or channel, such that opportunities for inserting the watermark such that it is masked by the PEE of the audio signal are limited. In addition, there exists no option to provide redundancy; that is, the entire watermark is included only once in the audio signal, such that if any part of it is damaged, it is difficult, if not impossible, to recover. Finally, there is no way to "force" an opportunity such that a minimum time between transmissions of the watermark data can be enforced or to "create" an opportunity where one almost exists by changing the gain of the audio signal.

Therefore, what is needed is an improved system for providing a digital watermark in an audio signal.

SUMMARY OF THE INVENTION

The foregoing problems are solved and a technical advance is achieved by a computer-implemented system for providing a digital watermark in an audio signal. In a preferred embodiment, a audio file, such as a .WAV file, containing an audio signal to be watermarked is processed by an encoder using an algorithm of the present invention herein referred to as the "PAWS algorithm" to determine and log the location and number of opportunities that exist for inserting a watermark into the audio signal such that it will be masked by the PEE of the audio signal. The user can adjust certain parameters of the PAWS algorithm before the audio file is processed. A/B/X testing between the original and watermarked files is also supported to allow the user to undo or re-encode the watermark, if desired.

In particular, the encoder divides the frequency spectrum into seven "critical bands", each of which includes two carrier frequencies for representing logic 0 and logic 1, respectively. The basic encoding process is as follows. First, the user sets up the desired parameters for the algorithm, including selecting which critical bands are to be active, specifying, in dB, the desired "headroom" between the PEE of the audio signal and the amplitude of the encoded watermark signal transmitted in each active band, and specifying the maximum time between transmissions of the encoded watermark signal.

If the encoding is not being performed in real-time, the user executes a preconditioning phase. During preconditioning, the encoder runs through the entire .WAV file and logs watermark opportunities according to the PAWS algorithm and the parameters specified by the user. In addition, the encoder detects "near-miss" opportunities in the audio signal; that is, points in the audio signal that would constitute opportunities with a small adjustment to the gain. The encoder adjusts the gain of the audio signal at that point to create an opportunity therefrom. The preconditioned audio signal is written back to a .WAV file.

In a preferred embodiment, the watermark is formatted as a frame of 32 characters. During operation, the original or preconditioned .WAV file is input to the encoder, which monitors each active critical band of the audio signal to detect opportunities for inserting watermark data in accordance with the PEE of the signal within the band, as well as the user-defined parameters. The existence and location of each opportunity is logged and the encoder determines how many bytes of the watermark word (a "subframe") may be transmitted during that opportunity, according to the data rate of that band, by measuring the width of an opportunity and dividing by the data rate, which yields the size of the data transmission. The encoder encodes the watermark using Gaussian Minimal Shift Key ("GMSK") modulation and incorporates the encoded subframes of the watermark data block into the audio signal at the opportunity.

In one aspect, at each opportunity, a timer is reset to a maximum time between opportunities, which is either a default value or a value selected by a user. If the timer times out before the next opportunity is detected, the encoder "forces" an opportunity by cross-fading in an 18 kHz low pass filter ("LPF") to clean out the band above 18 kHz, transmitting the watermark signal using GMSK modulation at carrier frequencies 18.5 kHz (for logic 0) and 19.5 kHz (for logic 1) and a data rate of 1200 bps, and then cross-fading out the LPF.

In the preferred embodiment, each portion of watermark data to be inserted at a given opportunity is preceded by a 4-bit preamble. In addition to the four preamble bits, additional bits must be allocated in each subframe to indicate which piece of the overall watermark the present burst carries. If the seven bands are used, there are a minimum of 16 bits per transmission. Therefore, four more bits may be used to indicate which character the present character is and there are at least eight bits left over to carry actual watermark data. If a higher frequency band carries more than 16 bits, then the preamble indicates the index of the first character of the transmission.

Alternatively, rather than using a 4-bit index preamble bit, one preamble could be assigned to indicate the start of a frame and another assigned to the rest of the frame, in which case 12 bits of each transmission would be left for carrying data.

In any event, each subframe of watermark data is modulated using GMSK modulation centered at the geometric mean of the two carrier frequencies within the band and mixed with the audio signal at a level defmed by the user ("headroom"). The resultant watermarked audio signal is stored in a file in memory.

Information concerning the total number of opportunities and the average and maximum time between them is made available to the user so that he or she can determine how well the current settings for the algorithm parameters performed. At this point, the user may wish to change some of the parameters, for example, if the average time between transmissions is too great or the total number of opportunities is too small.

Once the audio file has been processed, the user can audition the original .WAV file against the watermarked audio file. A conventional .WAV viewer window is provided for this purpose, with controls for advancing to the next or previous watermark position and for auditioning the original ("A"), watermarked ("B"), or unknown random ("X") version, which allows a user to listen to the original or watermarked version without knowing which version they are listening to, thereby eliminating any personal bias that might affect the user's perception of the watermark. During the auditioning phase, the user may amplify or attenuate the level of each watermark instance via a level control with a range of +/−20 dB. This level will be applied to that instance of the watermark during the next run of the encoder.

Once the user has auditioned the watermarked file, the file can be saved in any one of a number of known formats. The encoding process is now complete.

On the decoding end, a decoder decodes the watermark from the watermarked signal using GMSK demodulation. The result of the GMSK demodulation is, for each band, a "random" stream of 0's and 1's.

The watermark signal is detected from the data stream output each of the GMSK demodulators as follows. First, the data stream is sampled at a particular sample rate "Fs". If the baud rate ("Fb") is related to the sample rate by a known ratio ("R"), e.g., R=Fs/Fb, then the output from the GMSK demodulator can be routed through a sliding window of width R and observed to detect all 1's or all 0's, indicating what appears to be a valid bit. Using four of these sliding comparators, the full preamble can be detected, thus indicating the start of a transmission of a watermark subframe.

Once a preamble has been detected, a comparator of width R is used to detect each bit of the subframe. If anything but all 0's or 1's is detected in each bit cell, the whole subframe is discarded, since there was either a faulty preamble detection (e.g., it was really audio information that looked like the preamble) or the signal was negatively impacted by noise during transmission. If R−1 or R+1 0's or 1's are detected, the sample rate might be off by a fraction, so the discrepancy is ignored and the bit counter is reset upon the next state change.

In one embodiment, the entire watermark is sent once, with the various subframes transmitted in the various active critical bands, such that a portion of the watermark may be sent in each of the active bands, thereby increasing the number of opportunities for inserting the watermark. In another embodiment, the entire watermark is inserted in each of the bands, such that the watermark appears seven times in the watermarked audio signal (assuming all of the bands are designated as active), thereby providing redundancy.

A technical advantage achieved with the invention is that it is capable of "forcing" an opportunity if no opportunities have been detected for a predefined period of time, thereby to ensure that all of the watermark data is transmitted.

A further technical advantage achieved with the invention is that it operates in seven critical bands, thereby providing increased opportunities for including the watermark data and the option for redundancy, where desirable.

Another technical advantage achieved with the invention is that the audio signal can be preconditioned such that if a "near-opportunity" is detected, a filter can be used to change the frequency response of the system to create an opportunity.

BRIEF DESCRIPTION OF THE DRAWINGS

FIG. 1 is a block diagram of the system of the present invention for inserting a digital watermark in an audio signal.

FIG. 1A is a block diagram of an encoding portion of the system of FIG. 1.

FIG. 6 is a block diagram of a decoding portion of the system of FIG. 1.

DETAILED DESCRIPTION OF A PREFERRED EMBODIMENTS

Figure 2:
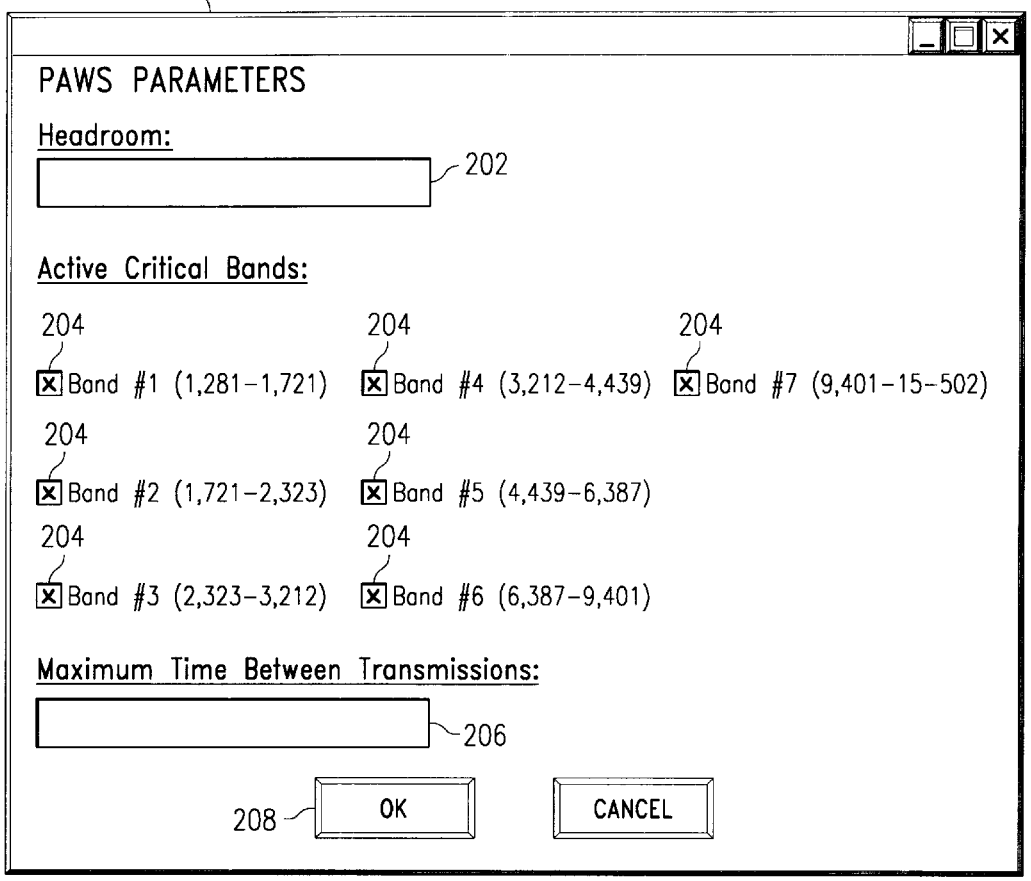
FIG. 2 illustrates an exemplary user interface screen of the system of the present invention.

As previously indicated, in accordance with features of the present invention, the frequency spectrum is divided into seven "critical bands," as shown below in Table I. Each of these bands includes two carrier frequencies for representing logic 0 and logic 1, respectively. The data rate of each band, in bits per second ("bps") varies and is specified by the entry for the band in the column designated "Data Rate (bps)". For example, band #1 is defined as the range of frequencies from 1,281 Hz to 1,721 Hz. Logic 0 and logic 1 are represented within band #1 by 1,387 Hz and 1,607 Hz, respectively. The data rate for band #1 is 320 bps.

TABLE I

| Band # | Lower Band Edge (Hz) | Upper Band Edge (Hz) | Logic 0 Carrier Freq. (Hz) | Logic 1 Carrier Freq. (Hz) | Data Rate (bps) |
| --- | --- | --- | --- | --- | --- |
| 1 | 1,281 | 1,721 | 1,387 | 1,607 | 320 |
| 2 | 1,721 | 2,323 | 1,856 | 2,157 | 320 |
| 3 | 2,323 | 3,212 | 2,525 | 2,970 | 640 |
| 4 | 3,212 | 4,439 | 3,500 | 4,114 | 640 |
| 5 | 4,439 | 6,387 | 4,880 | 5,854 | 1280 |
| 6 | 6,387 | 9,401 | 7,013 | 8,521 | 1280 |
| 7 | 9,401 | 15,502 | 10,543 | 13,593 | 2560 |

It should be noted that data rates have been chosen that are related by powers of two, allowing the decoder to derive a master bit clock ("MBC") from any (or all) bands and utilize the MBC for all bands.

FIG. 1 illustrates a system 10 embodying features of the present invention. In a preferred embodiment, the system 10 is implemented using a conventional computer 12 having a display 14, an audio input device, such as a microphone, 16, one or more user input devices, such as a keyboard and/or a mouse, collectively designated by a reference numeral 17, and an audio output device, such as a speaker, 18. As illustrated in FIG. 1, and as will be described in greater detail below, the system 10 includes an encoding portion 20 and a decoding portion 22. It will be recognized that a single computer, such as the computer 12, may be used to implement one or both of the encoding and decoding portions 20, 22.

Referring to FIG. 1A, the encoding portion 20 of the system of the present invention comprises an encoder 102 that implements a PAWS algorithm 104 and a memory device 106 connected to the encoder 102. The memory device 106 is used to store various files for use in connection with the present invention, including an original audio file, such as a .WAV file, 108 containing the original audio data to be watermarked and a watermark file 110 containing the watermark data. Also stored in the memory device 106 are a user parameters file 112 for storing user parameters specified using a user interface screen, such as a screen 200 shown in FIG. 2.

Referring to FIG. 2, in accordance with a feature of the present invention, the user is prompted to specify certain parameters for use in controlling certain aspects of the operation of the encoding portion 20. In particular, using the screen 200, the user can specify, in dB, in a "Headroom" field 202, the desired headroom between the PEE of the audio signal and the amplitude of the encoded watermark signal. In addition, the user can designate as active one or more of the seven critical bands by checking a checkbox 204 associated with each band selected to be active. The default state for each critical band is active, since this allows the most opportunities to encode the watermark signal. Although not shown in FIG. 2, it should be noted that headroom can be designated for each of the active critical bands individually as well. Finally, the user can specify, in seconds, the maximum time that should be allowed to elapse between transmissions of watermark data with an entry in a "Max. Time Between Transmissions" field 206. The default value for this parameter is 3 seconds, the goal being to transmit 16 bytes of encoded watermark data every three seconds. Once the desired parameters have been specified, the user clicks on or otherwise selects an "OK" button 208 to store the parameters in the user parameters file 112 (FIG. 1A).

Referring again to FIG. 1A, after the user enters the parameters, as described with reference to FIG. 2, if the audio data is to be watermarked other than in real-time, the user enters a preconditioning phase, in which the audio signal stored in the original audio file 108 is input to a preconditioner 114. As will be described in greater detail with reference to FIG. 3, the preconditioner 114 preconditions the audio signal by detecting near-miss opportunities and then adjusting the gain of the audio signal to create useable opportunities from such near-misses. Once the audio signal is preconditioned, it is stored in a preconditioned audio file 116 in the memory device 106.

Figure 3:
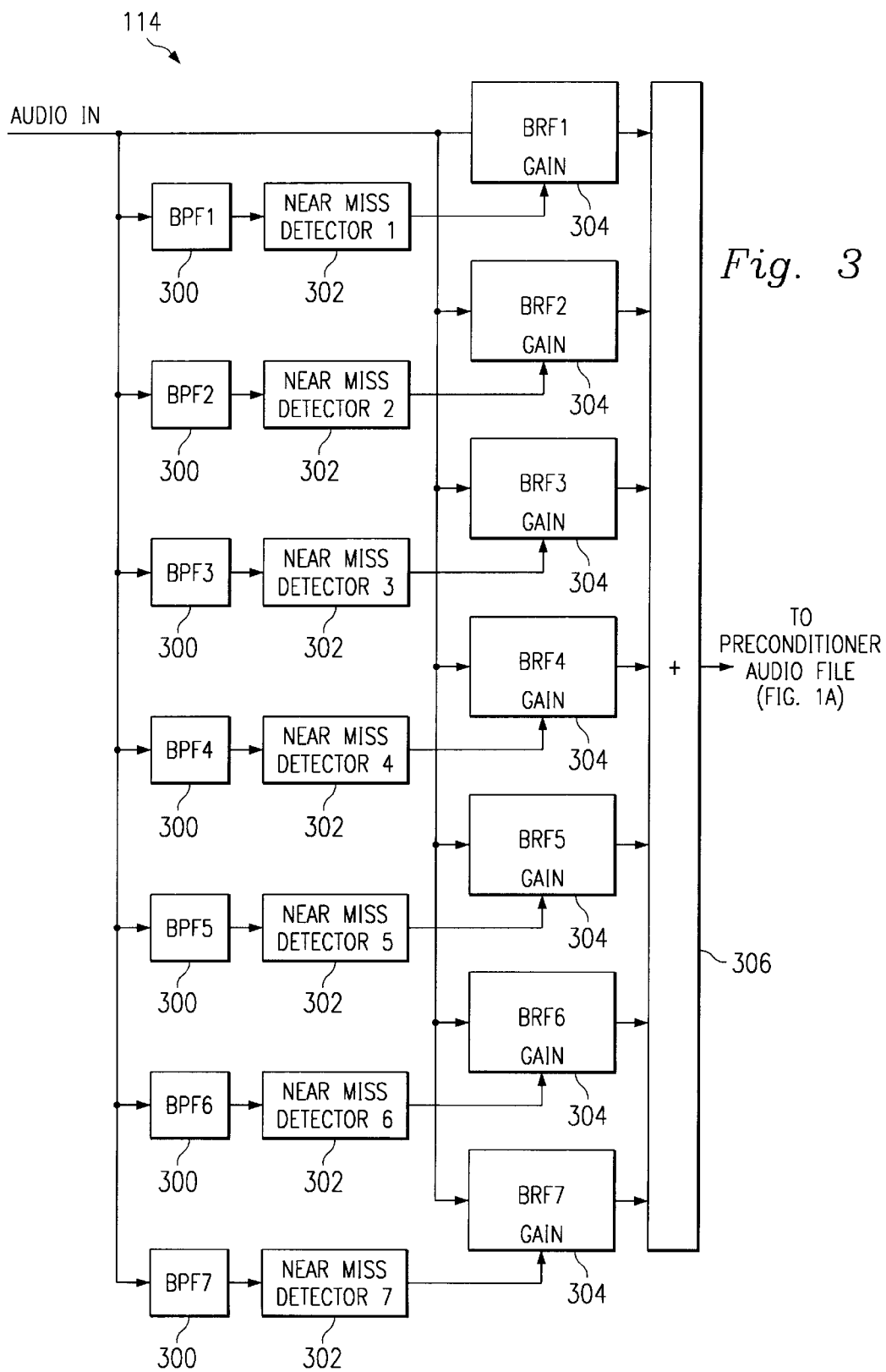
FIG. 3 is a block diagram of a preconditioner of the encoding portion of the encoder of FIG. 1A.

In particular, referring to FIG. 3, the preconditioner 114 comprises a number of BPFs 300, each of which is designed to pass one of the critical bands designated above in Table I. The output of each of the BPFs 300 is input to a respective near miss detector ("NMD") 302, which detects near-miss opportunities in the audio signal in the respective critical band. In particular, each NMD 302 determines how close we came to an opportunity. For example, if the encoder (FIG. 4) requires the audio signal level not to remain below a certain threshold for a certain duration and the audio signal level actually goes above that threshold by 3 dB for 5 ms, the NMD 302 will record the fact that during that period of time the signal energy in the respective critical band was 3 dB too high for an opportunity to occur.

The output of each NMD 302 is a control signal to a respective band reject filter ("BRF") 304 that adjusts how much the BRF attenuates the critical band. In the above example, the control signal would cause the BRF 304 to attenuate the band by 3 dB to force the opportunity at that point in time. The default gain of all of the BRFs 304 is 0 dB; therefore, their sum is the same as the input signal (no change). Whenever any one of the BRFs 304 attenuates a band the resulting signal is modified so that when it is run through the encoder the opportunities will actually occur. Each BRF 304 is configured similarly to a parametric equalizer, which is known by those skilled in the art to be a common audio processing device used in audio systems.

The signals output from each of the BRFs 304 are input to a summer 306, which reconstructs the audio signal and outputs it to the preconditioned audio file 116 (FIG. 1A).

Referring again to FIG. 1A, after preconditioning (for non-real-time applications) or irrespective of preconditioning (for real-time applications), the audio signal is input to the encoder 102 from the preconditioned audio file 116, if one exists, or from the original audio file 108, if the audio signal has not been preconditioned, along with the watermark data stored in the watermark data file 110 and the user parameters stored in the user parameters file 112. It will be recognized that FIG. 1A illustrates a non-real-time application, where preconditioning does take place.

Figure 4:
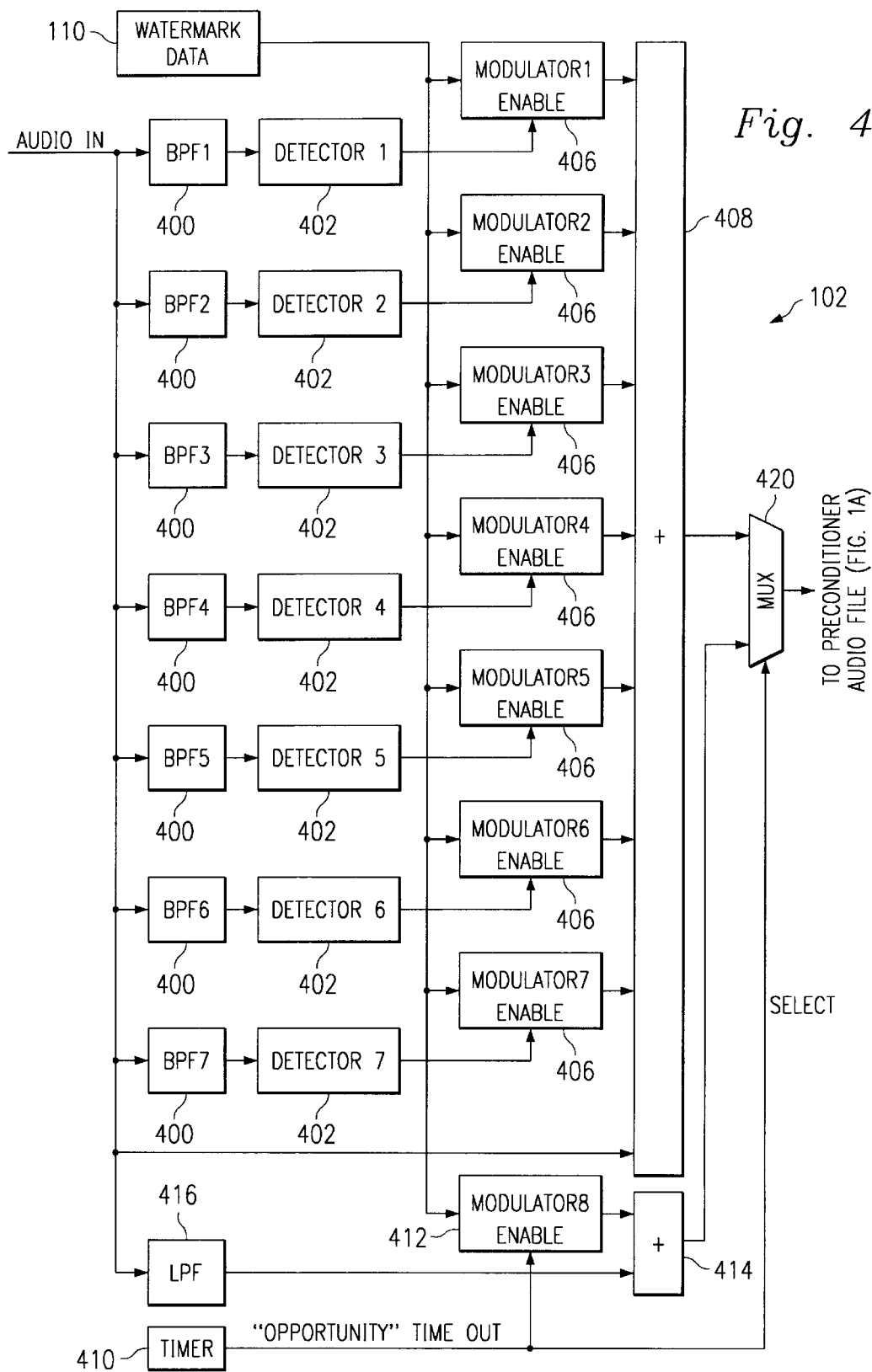
FIG. 4 is a block diagram of an encoder of the encoding portion of the encoder of FIG. 1A.

Referring now to FIGS. 1 and 4, the operation of the encoder 102 will be described in greater detail. Initially, an audio signal from the original audio file 108 (for real-time applications) or from the preconditioned audio file 116 (for non-real-time applications) is simultaneously filtered by seven BPFs 400 each tuned to one of the critical bands defined in Table I. The output of each of the BPFs 400 is input to a detector 402, which monitors the respective critical band for opportunities to insert watermark data into the audio signal according to the PAWS algorithm 104 and the parameters specified by the user. When such an opportunity is detected, the detector 402 outputs an enable signal to a respective modulator 406, implemented for each critical band as an FSK modulator tuned to the geometric mean of the two carrier frequencies of the band. The output of each of the modulators 406 is input to a summer 408 along with the audio signal output from the original audio file 108, resulting in a watermarked audio signal being output from the summer.

In a preferred embodiment, each time an opportunity is detected by one of the detectors 402, a timer 410 is reset to the value specified by the user in the Maximum Time Between Opportunities field 206 (FIG. 2), or to the default value, if the user did not specify a value. When the timer 410 times out, it enables a GMSK modulator 412, the input to which is the watermark data from the watermark data file 110, causing it to modulate the watermark data, which modulated watermark data is output to a second summer 414 where it is mixed with the output of an 18 kHz low pass filter ("LPF") 416, the input to which is the audio data from the original audio file 108. The output of the summer 414 is input to a two input multiplexer ("MUX") 420, the other input of which is tied to the output of the first summer 408. The output of the timer 410 is tied to the select input of the MUX 420 such that, when the timer times out, the output of the second summer 414 is output from the MUX 420 as the watermarked audio signal. As a result, whenever a specified maximum amount of time elapses between opportunities, an opportunity is "forced" by cross-fading in the LPF 416 to clean out the band above 18 kHz, GMSK modulating the watermark data at carrier frequencies 18.5 kHz (for logic 0) and 19.5 kHz (for logic 1) and a data rate of 1200 bps, and then cross-fading out the LPF.

The output of the MUX 420 is stored in a temporary audio file 118 in the memory device 106. At this point, the user can audition the original audio file 108 against the watermarked audio signal stored in the temporary audio file 118. A conventional .WAV viewer window (not shown) is displayed on the display 14 (FIG. 1) and has controls for advancing to the next or previous watermark position and for auditioning the original ("A"), watermarked ("B"), or unknown random ("X") version, which allows a user to listen to the original or watermarked version without knowing which version they are listening too, thereby eliminating any personal bias that might affect the user's perception of the watermark. During the auditioning phase, the user may amplify or attenuate the level of each watermark instance via a level control with a range of +/−20 dB. This level will be applied to that instance of the watermark during the next run of the encoder.

In addition, information concerning the total number of opportunities and the average and maximum time between them is stored in a statistics file 122 and can be displayed to the user on the display 14 (FIG. 1) so that he or she can determine how well the current settings for the algorithm parameters performed. At this point, the user may wish to change some of the parameters, for example, if the average time between transmissions is too great or the total number of opportunities is too small.

Once the user has auditioned the temporary file 118, the file can be saved in any one of a number of known formats.

In one embodiment, the PEE is defined as an exponential decay that begins when a burst of energy in a band is followed by at least 3 dB less energy in that band for 10 ms or more. The value of the exponential at any time specifies the maximum level that the GMSK signal may be transmitted at that time. The user control for "headroom" defines a further attenuation under this exponential.

Figure 5:
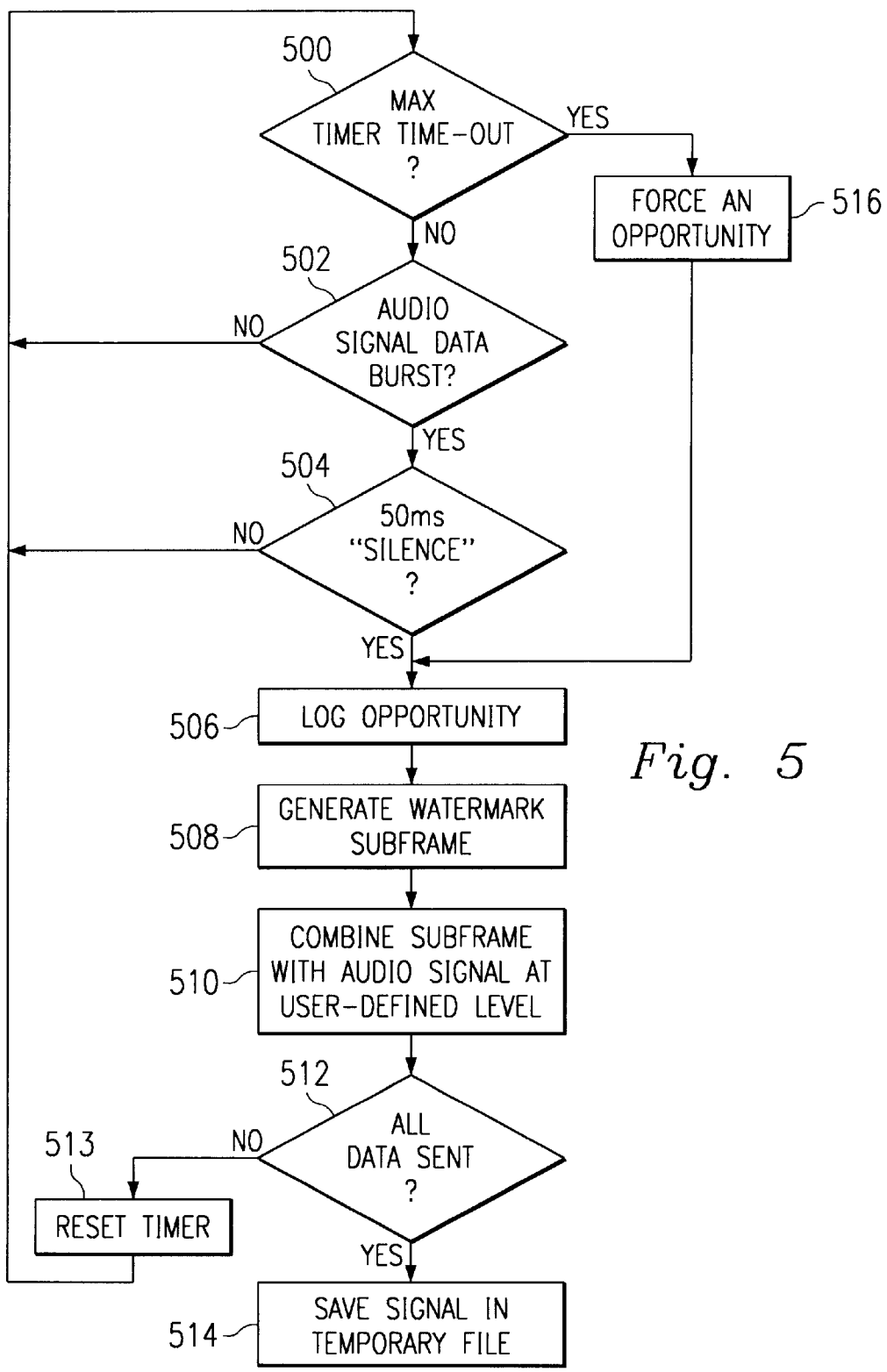
FIG. 5 is a flowchart of the operation of the encoding portion of FIG. 1A.

FIG. 5 is a flowchart of the operation of the encoder 102 (FIG. 1A). It should be recognized that the algorithm described with reference to FIG. 5 is implemented for each of the critical bands designated as active by the user as described above with reference to FIG. 2. Moreover, in connection with FIG. 5, "audio signal" shall be deemed to refer to either the signal stored in the original audio file 108, of no preconditioning has been performed, or the preconditioned audio signal stored in the preconditioned audio file 116, if preconditioning has been performed. In step 500, a determination is made whether the maximum time between transmissions, as specified by the user as described above with reference to FIG. 2, has elapsed. This step is performed by determining whether the timer 410 (FIG. 4) has timed out. If not, execution proceeds to step 502, in which a determination is made whether a data burst, or opportunity, has been detected in the audio signal. If not, execution returns to step 500; otherwise, execution proceeds to step 504.

In step 504, a determination is made whether the data burst is followed by at least 3 dB less energy in the band for at least 10 ms. If not, execution returns to step 500; otherwise, execution proceeds to step 506, in which the opportunity is logged, and then to step 508, in which a watermark data subframe is generated.

In a preferred embodiment, the watermark is formatted as a frame of 32 characters. Each portion of watermark data to be inserted at a given opportunity ("subframe") is preceded by a 4-bit preamble. In addition to the four preamble bits, additional bits must be allocated in each subframe to indicate which piece of the overall watermark the present burst carries. If the seven bands are used, there are a minimum of 16 bits per transmission. Therefore, four more bits may be used to indicate which character the present character is and there are at least eight bits left over to carry actual watermark data. If a higher frequency band carries more than 16 bits, then the preamble indicates the index of the first character of the transmission.

Alternatively, rather than using a 4-bit index preamble bit, one preamble could be assigned to indicate the start of a frame and another assigned to the rest of the frame, in which case 12 bits of each transmission would be left for carrying data.

Referring again to FIG. 5, in step 510, the watermark data subframe is combined with the audio signal at level as defined by the user as described above with reference to FIG. 2. In step 512, a determination is made whether the entire watermark frame has been sent. If not, execution proceeds to step 513, in which the timer 410 is reset, and then returns to step 500; otherwise, execution proceeds to step 514 and the watermarked audio file is saved as a temporary file.

Referring again to step 500, if a determination is made that the maximum time between transmissions has elapsed, execution proceeds to step 516, in which an opportunity is forced, as described with reference to FIG. 3. Upon completion of step 516, execution proceeds to step 506.

As previously indicated, the temporary file generated as a result of the encoding described with reference to FIG. 5 may be auditioned and the parameters therefore changed prior to the watermarked signal being saved as a permanent file.

As previously indicated, in one embodiment, the entire watermark is sent once, with the various subframes transmitted in the various active critical bands, such that a portion of the watermark may be sent in each of the active bands, thereby increasing the number of opportunities for inserting the watermark. In another embodiment, all of the watermark data is inserted in each of the bands, such that the watermark appears seven times in the watermarked audio signal (assuming all of the bands are designated as active), thereby providing redundancy.

FIG. 6 illustrates, in greater detail, the decoder portion 22 of FIG. 1A.

Initially, a watermarked audio signal is input to the decoder portion 22 from either an audio file or via the audio input device 16 (FIG. 1). The watermarked audio signal is simultaneously filtered by seven BPFs 601 each tuned to one of the critical bands defined in Table I. In a preferred embodiment, each of the BPF 601 have a Gaussian-shaped band pass response. The output of each of the BPFs 601 is input to a respective FSK demodulator 602, each of which is implemented as a phase-locked loop ("PLL") tuned to the geometric mean of the two carrier frequencies of the respective critical band. The result of each BPF 601/demodulator 602 pair is to GMSK demodulate the watermarked audio signal in the respective critical band. The output of each of the demodulators 602 is input to a respective data detector 604 which detects the watermark data. In a preferred embodiment, each of the data detectors 604 is implemented as described below. The output of the data detectors 604, comprising the watermark data, are stored in a file in memory 106.

As previously indicated, in the preferred embodiment, a four-bit preamble is used to indicate the start of watermark data. The pattern of the preamble is largely arbitrary, but should be selected to be something that is not likely to occur during idle conditions (i.e., not all 0's or all 1's). For the sake of example, the pattern 1010 (hex A) has been chosen. The decoding portion 22 performs FSK demodulation, using the demodulators 602, on the incoming watermarked audio signal and the output of each is a stream of 0's and 1's. From this, the watermark data will be detected.

To do this, the stream of 0's and 1's is sampled at a particular sample rate "Fs". If the baud rate ("Fb") is related to the sample rate by a known ratio ("R"), e.g., R=Fs/Fb, then the output from each FSK demodulator 602 can be routed through a detector 604 comprising a sliding window of width R, which watches for all 1's or all 0's, indicating what appears to be a valid bit. Using four of these sliding comparators in each detector 604, the full preamble can be detected, thus indicating the start of a transmission of the watermark. This is a more efficient way to detect the preamble than using a 4×R-wide detector. Exemplary values for Fs, Fb, and R, are 44.1 kHz, 630 bps, and 70, respectively.

Once the preamble has been detected, a comparator of width R is used to detect each bit of the data frame. If anything but all 0's or 1's is detected in each bit cell, the whole thing is thrown out, since it is either a faulty preamble detection (e.g., it was really audio information that looked like the preamble) or the signal was interfered with by noise during transmission. If R−1 or R+1 0's or 1's are detected, the sample rate might be off by a fraction, so the discrepancy is ignored and the bit counter is reset upon the next state change.

In one embodiment, the invention described herein is implemented as a DirectX® plug-in to take advantage of the non-real-time capabilities of personal computer-based software, such as Cakewalk® and Sound Forge®. DirectX®, Cakewalk®, and Sound Forge® are registered trademarks of Microsoft Corporation, of Redmond, Wash., Twelve Tone Systems, of Watertown, Mass., and Sonic Foundry, Inc., of Madison, Wis., respectively.

Although illustrative embodiments of the invention have been shown and described, a wide range of modification, change, and substitution is intended in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A method of providing a digital watermark in an audio signal, the method comprising:
dividing a frequency spectrum of the audio signal into a plurality of critical bands;
specifying as active at least one of the critical bands;
monitoring the audio signal in each of the active critical bands to detect opportunities for inserting watermark data;
responsive to detection of each opportunity:
logging the opportunity;
encoding a portion of the watermark data; and
adding the encoded portion of the watermark data to the audio signal at each of the detected opportunities to create a watermarked audio signal; and
storing the watermarked audio signal in a second audio file.

2. The method of claim 1 further comprising:
determining whether the method is being performed in real-time; and
if the method is not being performed in real-time, preconditioning the audio signal.

3. The method of claim 2 wherein the preconditioning comprises:
detecting a near-miss opportunity in the audio signal; and
creating an opportunity from the near-miss opportunity.

4. The method of claim 1 wherein each of the critical bands includes first and second carrier frequencies for representing logic 1 and logic 0, respectively, within the critical band and wherein a data rate is specified for each of the critical bands such that all of the data rates are related by a power of two.

5. The method of claim 1 further comprising:
auditioning the second audio file; and
comparing the second audio file with the first audio file.

6. The method of claim 1 wherein the encoding comprises modulating the watermark data within the critical band using Gaussian Minimal Shift Key ("GMSK") modulation.

7. The method of claim 1 wherein the plurality of critical bands comprise seven critical bands.

8. The method of claim 1 further comprising receiving user-specified parameters for detecting opportunities and encoding the watermark data.

9. The method of claim 8 wherein the user-specified parameters comprise a headroom parameter for defining a level of transmission of the encoded portion of the watermark data relative to the audio signal.

10. The method of claim 8 wherein the user-specified parameters comprise a maximum time between transmissions parameter for defining the maximum time that should be allowed to elapse between opportunities for adding the encoded watermark data in the audio signal.

11. The method of claim 8 wherein the adding further comprises adding the encoded portion of the watermark data to the audio signal at a level specified by the user.

12. The method of claim 1 wherein the specifying as active at least one of the critical bands is performed by the user.

13. The method of claim 1 wherein the detecting opportunities further comprises, for each active critical band, monitoring the critical band for a data burst followed by a period of no energy.

14. The method of claim 1 wherein the opportunities are defined by a perceptual entropy envelope of the audio signal within a critical band.

15. The method of claim 1 further comprising:
determining whether a maximum time between transmissions as specified by a user has elapsed since a last transmission; and
if the specified maximum time between transmissions has elapsed, forcing an opportunity.

16. The method of claim 15 wherein the forcing an opportunity comprises:
cross-fading in a low pass filter ("LPF");
transmitting the watermark signal using GMSK at first and second carrier frequencies for representing logic 1 and logic 0, respectively; and
cross-fading out the LPF.

17. The method of claim 16 wherein the LPF is an 18 kHz LPF and the first and second frequencies are 18.5 kHz and 19.5 kHz, respectively.

18. The method of claim 1 further comprising:
providing to a user an indication of the number of opportunities and a maximum and average time between opportunities.

19. Apparatus for providing a digital watermark in an audio signal, the apparatus comprising:
means for dividing a frequency spectrum of the audio signal into a plurality of critical bands;
means for specifying as active at least one of the critical bands;
means for monitoring the audio signal in each of the active critical bands to detect opportunities for inserting watermark data;
means responsive to detection of each opportunity for logging the opportunity, encoding a portion of the watermark data, and adding the encoded portion of the watermark data to the audio signal at each of the detected opportunities to create a watermarked audio signal; and
means for storing the watermarked audio signal in a second audio file.

20. The apparatus of claim 19 further comprising:
means for determining whether the method is being performed in real-time; and
means for preconditioning the audio signal if the method is not being performed in real-time.

21. The apparatus of claim 20 wherein the preconditioning comprises:
detecting a near-miss opportunity in the audio signal; and
creating an opportunity from the near-miss opportunity.

22. The apparatus of claim 19 wherein each of the critical bands includes first and second carrier frequencies for representing logic 1 and logic 0, respectively, within the critical band and wherein a data rate is specified for each of the critical bands such that all of the data rates are related by a power of two.

23. The apparatus of claim 19 further comprising:
means for auditioning the second audio file; and
means for comparing the second audio file with the first audio file.

24. The apparatus of claim 19 wherein the encoding comprises means for modulating the watermark data within the critical band using Gaussian Minimal Shift Key ("GMSK") modulation.

25. The apparatus of claim 19 wherein the plurality of critical bands comprise seven critical bands.

26. The apparatus of claim 19 further comprising means for receiving user-specified parameters for detecting opportunities and encoding the watermark data.

27. The apparatus of claim 26 wherein the user-specified parameters comprise a headroom parameter for defining a level of transmission of the encoded portion of the watermark data relative to the audio signal.

28. The apparatus of claim 26 wherein the user-specified parameters comprise a maximum time between transmissions parameter for defining the maximum time that should be allowed to elapse between opportunities for adding the encoded watermark data in the audio signal.

29. The apparatus of claim 26 wherein the means for adding further comprises means for adding the encoded portion of the watermark data to the audio signal at a level specified by the user.

30. The apparatus of claim 19 wherein means for the detecting opportunities further comprises, for each active critical band, means for monitoring the critical band for a data burst followed by a period of no energy.

31. The apparatus of claim 19 wherein the opportunities are defined by a perceptual entropy envelope of the audio signal within a critical band.

32. The apparatus of claim 19 further comprising:
means for determining whether a maximum time between transmissions as specified by a user has elapsed since a last transmission; and
means for forcing an opportunity if the specified maximum time between transmissions has elapsed.

33. The apparatus of claim 32 wherein the means for forcing an opportunity comprises:
means for cross-fading in a low pass filter ("LPF");
means for transmitting the watermark signal using GMSK at first and second carrier frequencies for representing logic 1 and logic 0, respectively; and
means for cross-fading out the LPF.

34. The apparatus of claim 33 wherein the LPF is an 18 kHz LPF and the first and second frequencies are 18.5 khz and 19.5 kHz, respectively.

35. The apparatus of claim 19 further comprising:
means for providing to a user an indication of the number of opportunities and a maximum and average time between opportunities.

36. A system for adding a digital watermark to an audio signal, the system comprising:
   an encoder for monitoring a critical band of the audio signal to detect an opportunity to insert a watermark data such that it is masked by the audio signal, encoding the watermark data responsive to detection of the opportunity, and inserting the encoded watermark data in the audio signal at the opportunity;
   a memory device connected to the encoder;
   a user input device; and
   a user interface.

37. The system of claim 36, wherein the encoder comprises:
   at least one band pass filter ("BPF") connected to receive the audio signal, the at least one BPF being tuned to the critical band;
   at least one detector having an input connected to receive the filtered audio signal output from the at least one BPF, the at least one detector detecting an opportunity in the critical band of the filtered audio signal to insert watermark data therein such that the watermark data is masked by the audio signal, the at least one detector outputting a control signal upon detection of an opportunity;
   at least one frequency shift key ("FSK") modulator connected to receive the control signal from the at least one detector, the at least one FSK modulator encoding the watermark data responsive to receipt of the control signal; and
   a first summer connected to receive the encoded watermark data and for adding the encoded watermark data to the audio signal.

38. The system of claim 37, wherein the encoder further comprises:
   a low pass filter ("LPF") for low pass filtering the audio signal;
   a timer for generating a time out signal upon the elapse of a predetermined maximum time period since a previous opportunity has been detected;
   a FSK modulator connected to receive the time out signal from the timer and to encode the watermark data responsive to receipt of the time out signal; and
   a second summer for adding the encoded watermark data from the latter FSK modulator with the filtered audio signal output from the LPF.

39. The system of claim 38 further comprising a multiplexer having inputs connected to receive the outputs of the first and second summers, respectively, and a select input connected to receive the time out signal, such that, upon receipt of the time out signal, the output from the second summer is output from the multiplexer; otherwise, the output from the first summer is output from the multiplexer.

40. The system of claim 38 wherein the LPF is tuned to 18 kHz.

41. The system of claim 37 wherein there are a plurality of BPFs each of which is tuned to a respective critical band; wherein there are a plurality of detectors each having an input connected to receive the filtered audio signal output from a respective one of the BPFs; wherein there are a plurality of FSK modulators connected to receive the control signal from a respective one of the detectors, wherein each of the FSK modulators encode the watermark data responsive to receipt of the respective control signal; and wherein the first summer is connected to receive the encoded watermark data from each of the FSK modulators and to add the encoded watermark data to the audio signal.

42. The system of claim 36 wherein the encoder comprises a preconditioner.

43. The system of claim 42 wherein the preconditioner comprises:
   at least one band pass filter ("BPF") connected to receive the audio signal, the at least one BPF being tuned to the critical band;
   at least one near miss detector ("NMD") having an input connected to receive the filtered audio signal output from the at least one BPF, the at least one NMD for detecting a near-miss opportunity in the critical band of the filtered audio signal to insert watermark data therein such that the watermark data is masked by the audio signal, the detector outputting a control signal upon detection of a near-miss opportunity; the at least one BRF being responsive to the control signal for adjusting a gain of the audio signal to create an opportunity in the critical band of the filtered audio signal; and
   a summer connected to receive the adjusted audio signal output from the at least one BRF.

44. The system of claim 43 wherein there are a plurality of BPFs each connected to receive the audio signal, wherein each of the BPFs is tuned to one of a plurality of critical bands; wherein there are a plurality of NMDs each having an input connected to receive the filtered audio signal output from a respective one of the BPFs and each adapted to detect a near-miss opportunity in the critical band of the filtered audio signal to insert watermark data therein such that the watermark data is masked by the audio signal and output a control signal upon detection of a near-miss opportunity; wherein the BRFs are responsive to the control signal for adjusting a gain of the audio signal to create an opportunity in the critical band of the filtered audio signal; and wherein the summer is connected to receive the adjusted audio signal output from each of the BRFs and add the received signals together.

45. The system of claim 36, wherein the user interface comprises a screen display presented on a display of a computer.

46. A system for adding a digital watermark to an audio signal, the system comprising:
   an encoding portion;
   a memory device connected to the encoding portion;
   a user input device;
   a user interface; and
   a decoder including
      at least one band pass filter ("BPF") connected to receive a watermarked audio signal, the at least one BPF being tuned to the critical band;
      at least one frequency shift key ("FSK") demodulator connected to receive filtered watermarked audio signal output from the at least one BPF, the at least one FSK demodulator demodulating the filtered watermarked audio signal input thereto; and
      at least one detector having an input connected to receive the demodulated watermarked audio signal output from the at least one FSK demodulator, the at least one detector for detecting watermark data from the demodulated watermarked audio signal; wherein the detected watermark data is stored in the memory device.

47. The system of claim 46 wherein there are a plurality of BPFs each being tuned to one of a plurality of critical bands; wherein there are a plurality of FSK demodulators each connected to receive the filtered watermarked audio signal output from a respective one of the BPFs for demodulating the filtered watermarked audio signal input thereto; wherein there are a plurality of detectors each having an input connected to receive the demodulated watermarked audio signal output from a respective one of the FSK demodulators; and wherein the detected watermark data is stored in the memory device.

48. A system for adding a digital watermark to an audio signal, the system comprising:

an encoding portion;

a memory device connected to the encoding portion;

a user input device;

a user interface; and a preconditioner for preconditioning the audio signal to create an opportunity from a near-miss opportunity and storing the preconditioned audio signal in the memory device.

49. A method of recovering a watermark from a watermarked audio signal, the method comprising:

filtering the watermarked audio signal using at least one band pass filter ("BPF") tuned to a critical frequency band;

demodulating the watermarked audio signal using Gaussian Minimal Shift Key ("GMSK") modulation; and detecting watermark data from the demodulated watermarked audio signal.

50. The method of claim 49 further comprising:

storing the detected watermark data in a memory device.

51. The method of claim 49 wherein the filtering further comprises filtering the watermarked signal using a plurality of BPFs each tuned to one of a plurality of bands.

52. The method of claim 51 further comprising recovering a portion of the watermark data from each of the critical bands.

53. The method of claim 51 further comprising recovering all of the watermark data from each of the critical bands.

54. A decoder for recovering watermark data from a watermarked audio signal, the decoder comprising:

at least one band pass filter ("BPF") connected to receive the watermarked audio signal, the at least one BPF being tuned to the critical band;

at least one frequency shift key ("FSK") demodulator connected to receive filtered watermarked audio signal output from the at least one BPF, the at least one FSK demodulator demodulating the filtered watermarked audio signal input thereto; and at least one detector having an input connected to receive the demodulated watermarked audio signal output from the at least one FSK demodulator, the at least one detector for detecting watermark data from the demodulated watermarked audio signal.

55. The system of claim 54 wherein the decoder further comprises a plurality of BPFs each connected to receive a watermarked audio signal, each of the BPFs being tuned to one of a plurality of critical bands;

a plurality of FSK demodulators each connected to receive the filtered watermarked audio signal output from a respective one of the BPFs for demodulating the filtered watermarked audio signal input thereto; and a plurality of detectors each having an input connected to receive the demodulated watermarked audio signal output from a respective one of the FSK demodulators for detecting watermark data from the demodulated watermarked audio signal.

56. The decoder of claim 54 further comprising a memory device connected to receive an output of the at least one detector.

57. The decoder of claim 55 further comprising a memory device connected to receive an output of each of the detectors.

58. The decoder of claim 56 wherein a single instance of the watermark data is stored in the memory device.

59. The decoder of claim 57 wherein multiple instances of the watermark data is stored in the memory device.

* * * * *